United States Patent [19]
Joseph, Jr. et al.

[11] Patent Number: 5,977,866
[45] Date of Patent: Nov. 2, 1999

[54] BIRD DISPERSING SYSTEM

[76] Inventors: John Barthell Joseph, Jr., P.O. Box 894, Greenville, Miss. 38701; Q. Martin Schoenheiter, Jr., 2850 S. Redwood, Road #1, Salt Lake City, Utah 84119

[21] Appl. No.: 09/015,769

[22] Filed: Jan. 29, 1998

Related U.S. Application Data

[60] Provisional application No. 60/037,232, Feb. 3, 1997.

[51] Int. Cl.⁶ ........................................................ G08B 3/00
[52] U.S. Cl. ...................................... 340/384.1; 340/385.1; 340/573.1; 116/22 A
[58] Field of Search ............................... 340/384.1, 384.3, 340/384.5, 385.1, 387.1, 573.1; 116/22 A

[56] References Cited

U.S. PATENT DOCUMENTS

| | | |
|---|---|---|
| 2,304,358 | 12/1942 | Hennefer . |
| 2,920,600 | 1/1960 | Hori et al. . |
| 2,941,197 | 6/1960 | Marotta . |
| 3,056,376 | 10/1962 | Bender . |
| 3,412,394 | 11/1968 | Lewis et al. ........................... 340/385.1 |
| 3,572,309 | 3/1971 | Freitas .................................... 340/385.1 |
| 3,633,560 | 1/1972 | DeFreitas ............................... 340/385.1 |
| 3,897,195 | 7/1975 | Finch . |
| 4,475,102 | 10/1984 | Troy et al. . |
| 4,573,427 | 3/1986 | Konzak .................................. 340/385.1 |
| 4,598,660 | 7/1986 | Konzak .................................. 340/385.1 |
| 4,656,770 | 4/1987 | Nuttle .................................... 340/385.1 |
| 4,745,859 | 5/1988 | Kyoung et al. ....................... 340/385.1 |
| 4,758,826 | 7/1988 | Wall . |

*Primary Examiner*—Nina Tong
*Attorney, Agent, or Firm*—Richard C. Litman

[57] ABSTRACT

A system for dispersing birds away from airfields includes a central computer unit and a base antenna system, a hand held transmitter, and a plurality of remotely disposed, positionable gas cannons, each cannon is connected to a single control unit. Each gas cannon produces a high decibel explosion by feeding a combustible gas from a pressurized storage tank housed within the cannon control unit. In addition, the system includes an endless recording of chaotic noises, such as barking dogs, sirens, breaking glass, etc., for broadcasting. The noise broadcasts are via all weather speakers remotely disposed along with the gas cannons. The noises, broadcast in 15–20 second bursts, are made simultaneously or alternatively to the gas cannons. Each control unit has a radio receiver powered by a battery. The central computer unit uses control software and a base antenna enabling transmission of operation instructions to the control units. An operator using the system may select the time and duration in which any combination of cannon firings or noise broadcasts. The hand held transmitter included with the system is used for remote communication to and operation of the central computer unit via the base antenna system.

19 Claims, 6 Drawing Sheets

BIRD DISPERSING SYSTEM

CROSS-REFERENCE TO RELATED APPLICATION

This application claims the benefit of U.S. Provisional Patent Application Serial No. 60/037,232, filed Feb. 3, 1997.

BACKGROUND OF THE INVENTION

1. Field of the Invention

The present invention relates to a system of noise making devices for dispersing or scaring away birds or other wildlife from airfields and other areas. More specifically, the invention relates to system of gas cannons which are operated by a hand held transmitter and a central computer unit having control software.

2. Description of Prior Art

Considerable damage to aircraft has been caused by birds congregating around airfields and flying into the paths of the aircraft during takeoff and landing. Many systems and devices attempting to solve this problem by scaring the birds from the area around the airfield with noise making devices have been shown in the prior art. These include devices which intermittently produce high decibel explosions and systems which include several noise making devices that are remotely controlled by a central computer unit. However, none of the prior art discloses a system for dispersing birds from an airfield which includes computer activated radio controlled systems utilizing a plurality of gas cannons and a plurality of solar powered radio receivers that may be selectively operated by a hand held transmitter and a central computer unit having control software.

U.S. Pat. No. 4,475,102, issued Oct. 2, 1984 to Troy, et al., shows a bird dispersal system which preferably includes a plurality of gas cannons that may be selectively controlled by a remote unit via electric cable or wires. In an alternate embodiment, a radio transmission may be employed as a communications link between the gas cannons and the remote unit.

The bird dispersal system of Troy et al. differs from the present invention in that the system does not include a hand held transmitter unit that allows the system to be operated from anywhere on the airfield, solar powered gas cannons, or a computer having control software that allows the timing and duration of operation of any selected combination of gas cannons to be controlled as does the present invention U.S. Pat. No. 2,920,600, issued Jan. 12, 1960 to Hori et al., and U.S. Pat. No. 2,941,197, issued Jun. 14, 1960 to Marotta each shows a device for producing high decibel explosions at regular intervals for the purpose of dispersing birds and other pests from the area in which the devices are placed. The devices of Hori et al. and Marotta feed a combustible gas from a pressurized tank into a combustion chamber where it is ignited by an electrical igniting element resulting in a high decibel explosion. While the devices of Hori et al and Marotta operate in a similar fashion to the gas cannons of the present invention, they are not mounted on rotating bases to allow the sound to be directed in a full 360° circle and they are not part of a computer and radio controlled system like the present invention. Additionally, by producing the high decibel explosions at regular intervals, birds often become quickly accustomed to the explosions and the devices become ineffective. The present invention is actively operated to prevent this problem.

U.S. Pat. No. 3,056,376, issued Oct. 2, 1962 to Bender, shows a device which produces a high decibel explosion at regular intervals by igniting a combustible gas in a combustion chamber that is mounted on a turntable. The device of Bender differs from the gas cannons of the present invention in that the combustible gas it uses is produced by calcium carbide and water rather than being fed from a pressurized gas tank, and in that its combustion chamber is caused to spin randomly to a different angular position by the force of each explosion unlike the present invention which uses gas cannons that are caused to rotate by a gas pressure powered chain and sprocket drive.

U.S. Pat. No. 2,304,358, issued Dec. 8, 1942 to Hennefer and U.S. Pat. No. 3,897,195, issued Jul. 29, 1975 to Finch, each shows a device for producing a combustible gas by the introduction of calcium carbide into water, feed the gas into a combustion chamber, and ignite it to produce a high decibel explosion. The devices of Hennefer and Finch differ from the present invention in that they do not utilize storage tanks of pressurized combustible gas and in that they are not part of a centrally controlled system.

U.S. Pat. No. 4,758,826, issued Jul. 19, 1988 to Wall, shows another device for producing a high decibel explosion. The Wall device ignites a small exploding charge placed within a combustion chamber to produce the explosion rather than igniting a combustible gas fed into the chamber from a pressurized storage tank.

None of the above inventions and patents, taken either singularly or in combination, is seen to describe the instant invention as claimed. Thus, a bird dispersing system solving the aforementioned problems is desired.

SUMMARY OF THE INVENTION

Accordingly, it is a principal object of the invention to provide a system of gas cannons which may be remotely and selectively operated to disperse birds from an area such as an airfield.

It is another object of the invention to provide a bird dispersing device having gas cannons rotatably mounted for selectively providing 360° area coverage.

It is a further object of the invention to provide a bird dispersal system which includes random audio sound generation.

Still another object of the invention is to provide a bird dispersal system with solar powered battery chargers that enable the battery powered radio receiver that controls the time and duration of gas cannon firing to be operated.

Still yet another object of the invention is to provide a bird dispersal system with solar powered battery chargers that enable the battery powered radio receiver that controls the time and duration of audio sound generation to be operated.

It is an object of the invention to provide improved elements and arrangements thereof in a bird dispersing system for the purposes described which is inexpensive, dependable and fully effective in accomplishing its intended purposes.

These and other objects of the present invention will become readily apparent upon further review of the following specification and drawings.

The present invention relates to a system of noise making devices for dispersing or scaring away birds from airfields and other areas. More specifically, the invention is a system for dispersing birds away from airfields which includes a central computer unit with control software, a hand held transmitter, and a plurality of rotatably mounted gas cannons that are connected to cannon control units. The gas cannons produce high decibel explosions by feeding a combustible gas from a pressurized storage tank housed within the cannon control unit into a combustion chamber of the gas cannon and then igniting the gas air mixture therein.

The cannon control units are steel cabinets which contain a battery powered VHF or UHF radio receiver in addition to the previously mentioned combustion gas storage tank. Additionally, the cannon control units have a solar panel connected to the battery power supply to eliminate the need for frequent battery replacement.

The central computer unit has a transmitter-receiver and control software that enables it to transmit operation instructions to the receivers housed within selective cannon control units. This allows a person using the system to select the time, duration, and direction in which the any combination of cannons will be fired.

In addition, the system, alternatively or simultaneously, includes a sound generation that audibly produces random noise for dispersing birds, and other wildlife. The sound is generated via weather proof speakers adjacent the control unit cabinets. The cabinets have a source of audio noise, such as barking dogs, roaring lions and bears, breaking glass, sirens, etc., and at least a two-channel amplifier. The source, for example, can be an endless loop recording played in 15–20 sec. intervals. Based on the commands of the computer unit the source outputs separate, discrete sounds to each channel of the amplifier. Each channel output of the amplifier is connected to one speaker, thus the audio source generates confusing chaotic noises for irritating and dispersing the fowl.

The system also includes a hand held transmitter that may be used to selectively operate the gas cannons through the central computer unit. All functions that may be carried out directly by the central computer unit may also be carried out using the hand held transmitter so that the system may be operated from any place at an airfield, or within the range of the transmitter.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
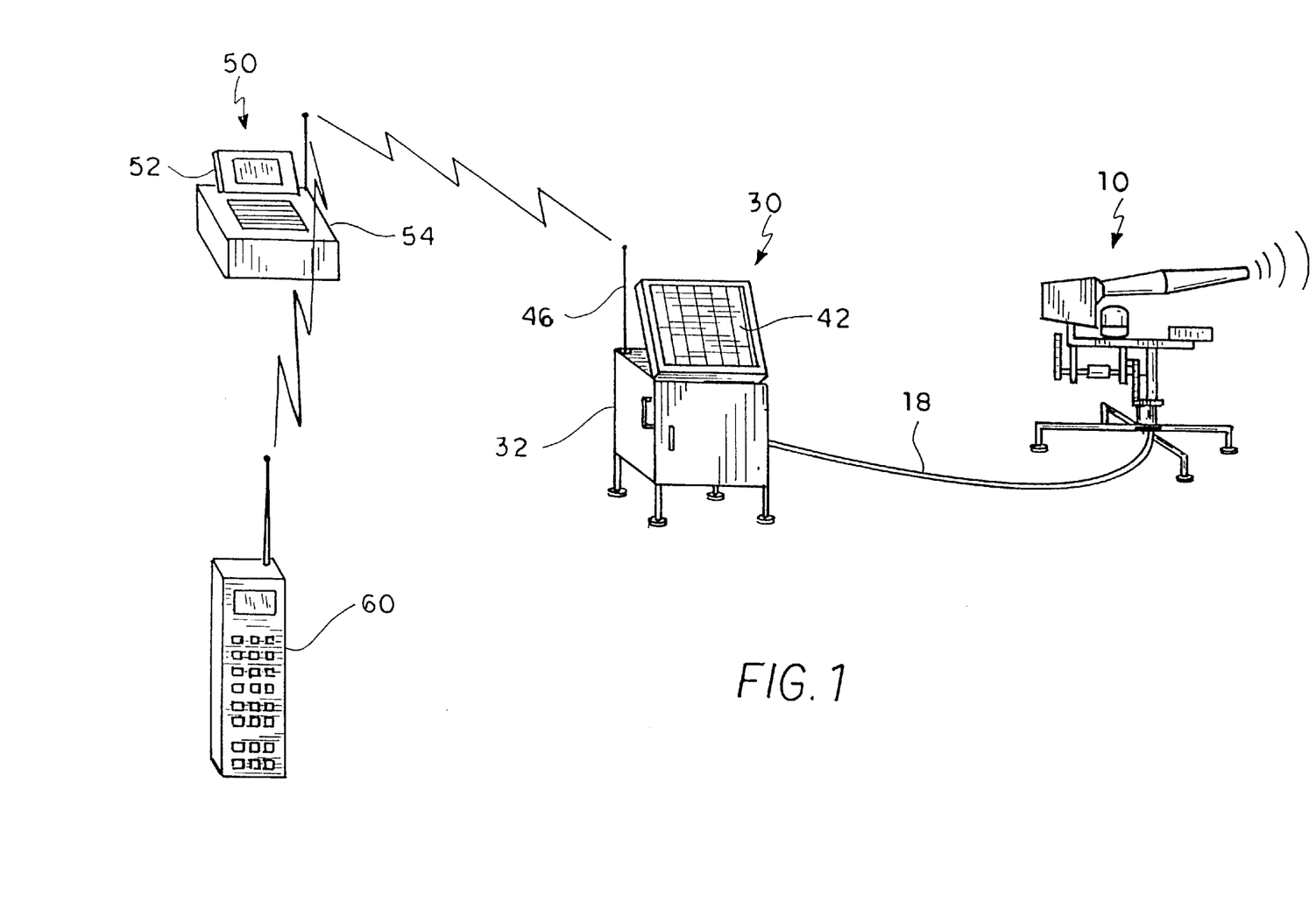
FIG. 1 is an environmental perspective view of the bird dispersing system of the present invention.

Referring to the drawings, FIG. 1 illustrates the bird dispersing system of the present invention. The bird dispersing system generally comprises a sound producing device in the form of at least one gas cannon 10. At least one cannon control unit 30 for actuating each gas cannon 10. A central computer unit 50 for controlling and operating each cannon control unit 30. A hand held transmitter 60 allows for remote operation of the central computer unit 50.

Figure 4:
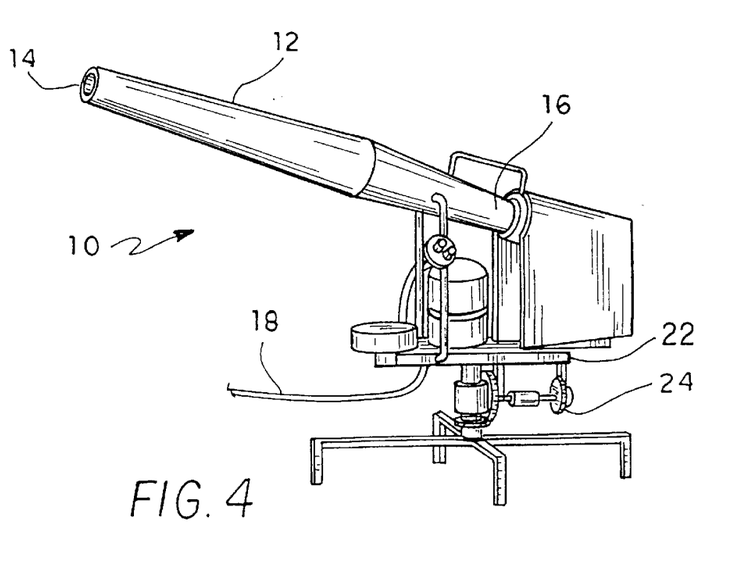
FIG. 4 is a perspective view of the gas cannon unit of the bird dispersing system of the present invention.

The gas cannon 10, as seen in FIG. 4, produces high decibel sound by explosively igniting a mixture of a combustible gas such as propane and air therein. The gas cannon generally includes a combustion chamber 12 fixed upon a base 22, and a motor and gearing system 24 for rotating the base 22 and combustion chamber 12.

The combustion chamber 12 is a generally tubular, having an open outlet end 14 and sealed inlet end 16. The diameter of the combustion chamber 12 tapers from a maximum near its longitudinal center to slightly reduced diameters at its outlet end 14 and its inlet end 16. The inlet end 16 of the combustion chamber 12 is fixedly attached to and supported by the base 22 so that the combustion chamber 12 extends therefrom at an angle. This causes the sound produced by the gas cannon 10 to be projected slightly upward from the outlet end 14.

The base 22 is supported by a gearing system 24 for rotating the base 22 and the combustion chamber 12 selectively through an arc of 360°. The explosive sound is allowed cannon to project in any selected direction about the arc for maximum dispersement of the wildlife. The gearing system 24 is actuated by any conventional method, such as being powered by gas pressure to a chain and sprocket drive, or driven by an electric or stepper motor.

A fuel line 18 connects the inlet end 16 of the combustion chamber 12 with a fuel tank 26, preferably liquid propane (LP). In the preferred embodiment, fuel tank 26 is housed within the cannon control unit 30. A valve 28, such as an electrically operated solenoid type valve, shown in FIG. 2, controls the supply of combustible gas to the combustion chamber 12. The fuel line 18 may also supply gas pressure to the gearing system 24. A gas pressure operated ignition device ignites the combustible gas and air mixture in the combustion chamber 12. Conventionally, a piezoelectric type ignition capsule contained within the combustion chamber 12 is used. It is apparent that since the valve 28 controls the flow of pressurized gas in the fuel line 18, the valve 28 also controls the operation of the ignition device for igniting the combustible gas. Likewise, the gearing system 24 is also responsive to the gas flow as controlled by the valve 28.

Figure 3:
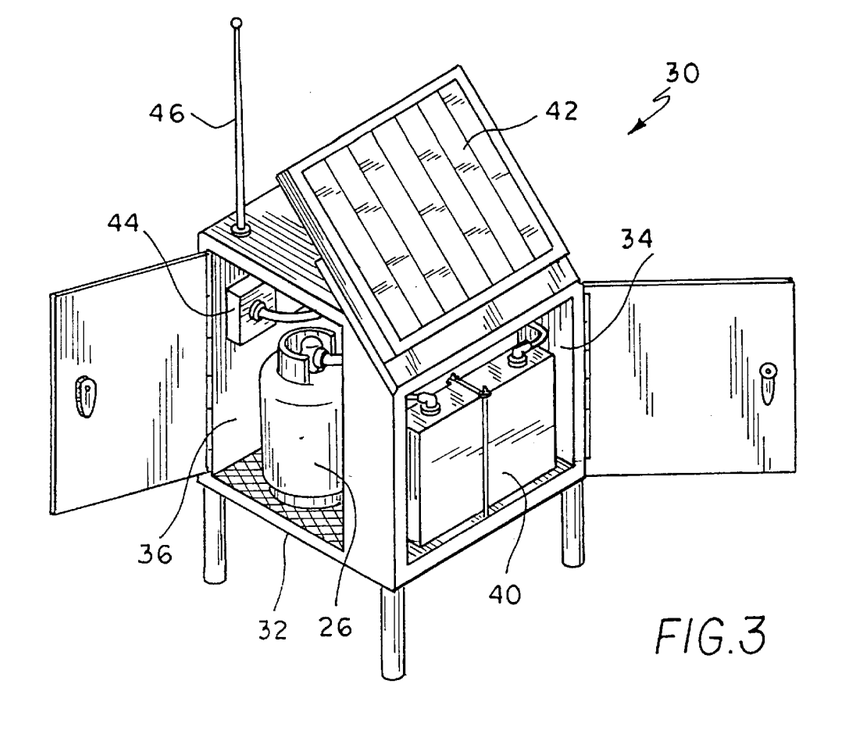
FIG. 3 is a perspective view of a cannon control unit of the bird dispersing system of the present invention.

Referring now to FIG. 3, the cannon control unit 30 includes a cabinet 32 with a solar panel 42 and an antenna 46 mounted thereon. The cabinet 32 is divided into a battery housing 34 containing a 12-volt battery 40 and a fuel tank housing 36 containing the fuel tank 26 and a receiver 44. Battery 40 provides power for the radio receiver 44 and the valve 28. The battery 40 is charged by the solar panel 42 mounted at an angle on the cabinet 32. The battery 40 may also provide power for an electric motor that may be used to rotate the gearing system 24.

The receiver 44 is connected to the antenna 46 extending vertically from the cabinet 32. Antenna 46 receives signals transmitted from the central computer unit 50. The receiver 44 includes electronics for controlling the valve 28, the ignition device, and the gearing system 24, upon receipt of instructions transmitted from the central computer unit 50. In the alternative, a transceiver or 2-way radio may be used in lieu of the receiver 44. The transceiver receives signals transmitted from the central computer unit 50 and also transmits information to the central computer unit 50 concerning remaining fuel supply, voltage readings, the time of cannon firings and number of cannon firings. This information will be recorded and printed on a report form on command from the central computer unit 50.

Figure 2:
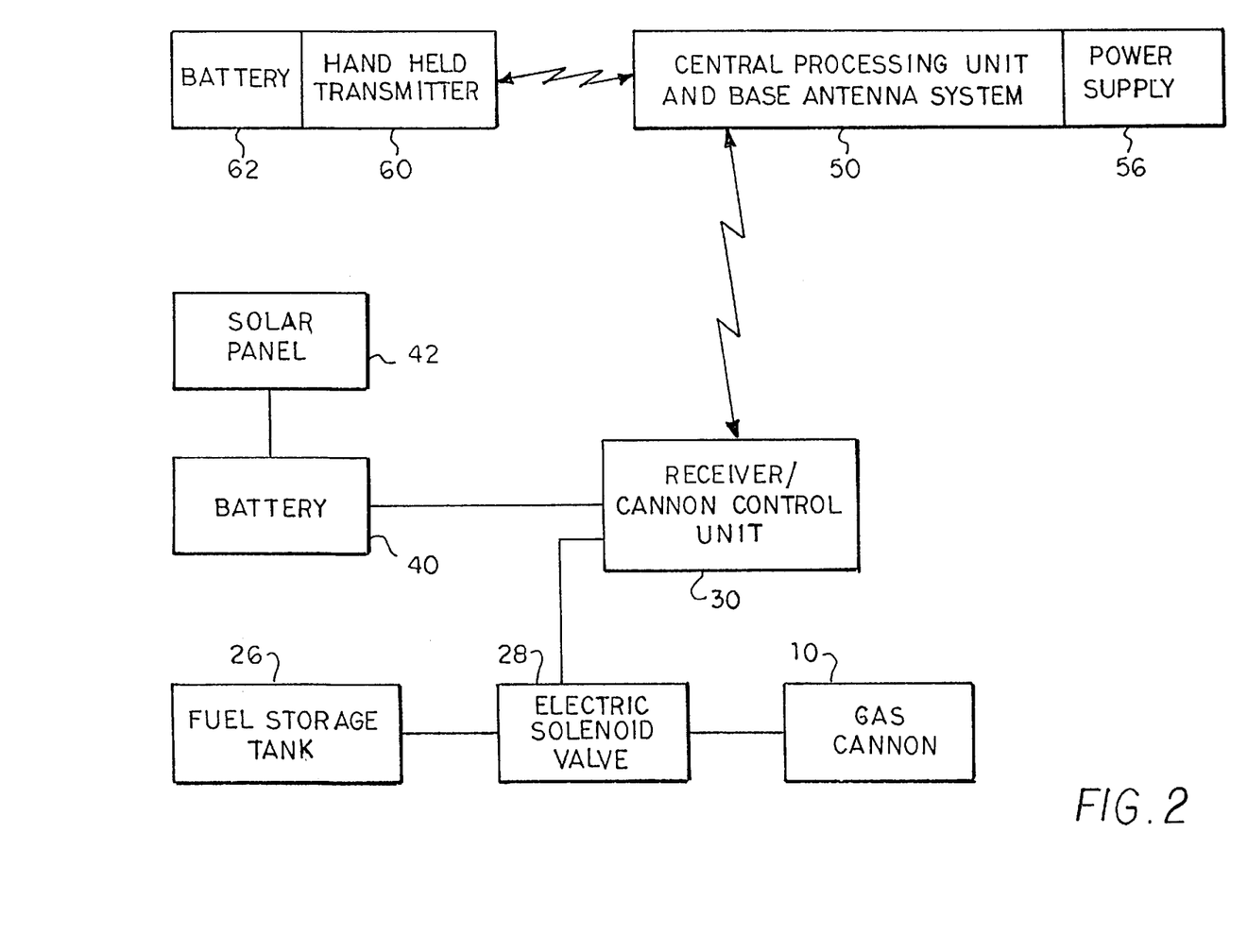
FIG. 2 is a block diagram of one arrangement of the bird dispersing system of the present invention.

The central computer unit 50 having power supply 56 includes a transceiver 54 and a computer 52. Suitable software for controlling the transceiver 54 is used. The software enables a user to selectively input any combination or sequence of the gas cannons 10 firings. Typically, parameters for issuing control signals are: the time to begin producing the sound and rotation; and the duration of the sound to be produced. With the parameters entered, a user may instruct the central computer unit 50 to transmit a signal for instructing the appropriate cannon control units 30 to carry out the input instructions. On such command a computer screen display, showing the entire airfield or any other area in a protected zone, will show the location of each firing station, gas cannon and sound generator. The display will show which gas cannons are firing and which are not firing during any period when the system is activated.

The central computer unit 50 may be operated either directly by using the computer 52 or by using the hand held transmitter 60. The hand held transmitter 60 powered by a battery 62 and is adapted to transmit a signal to the central computer unit 50 so that the central computer unit 50 may be remotely operated from anywhere on an air field where the system is being used.

Figure 5:
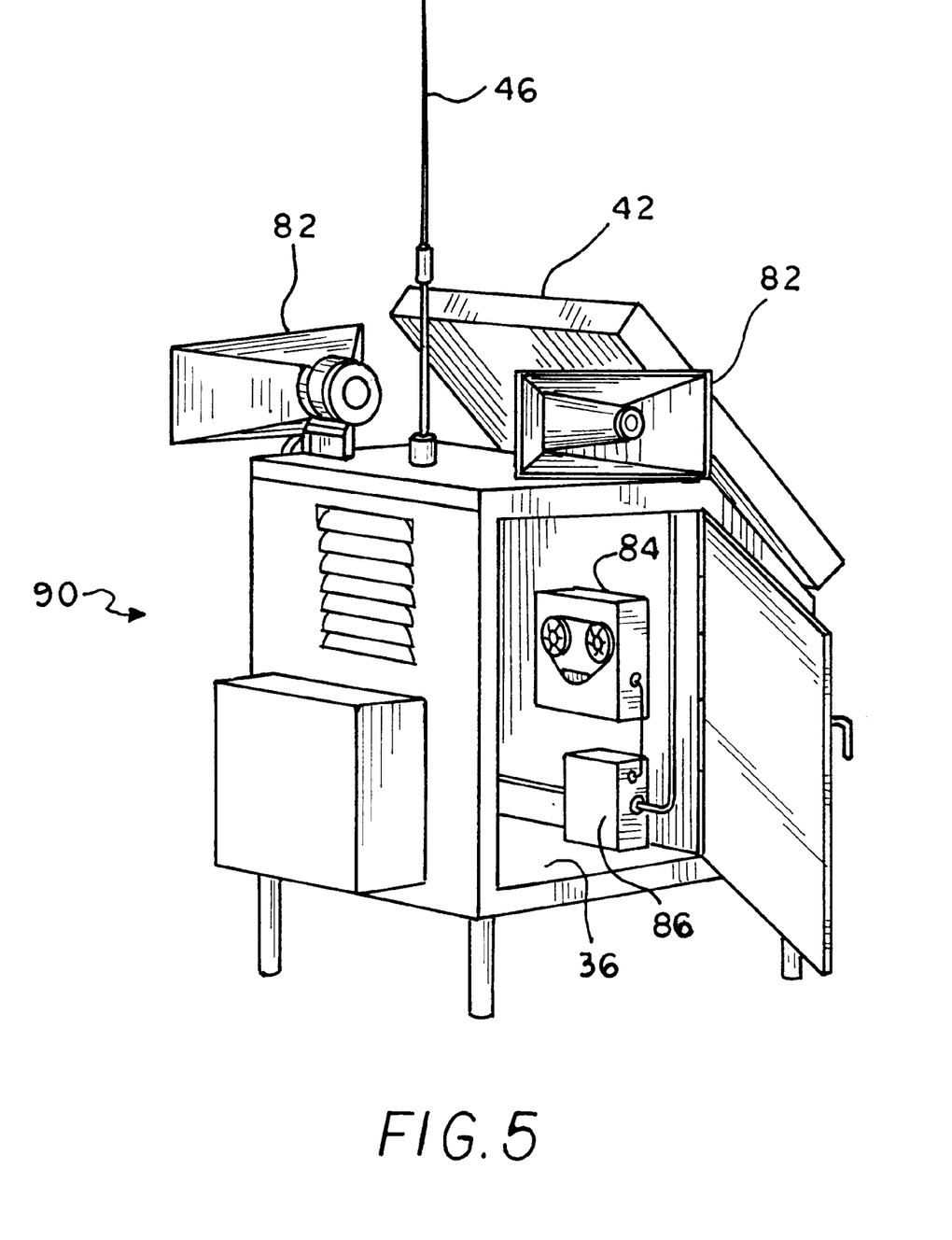
FIG. 5 is a perspective view of an alternative control unit of the bird dispersing system of the present invention.
Figure 6:
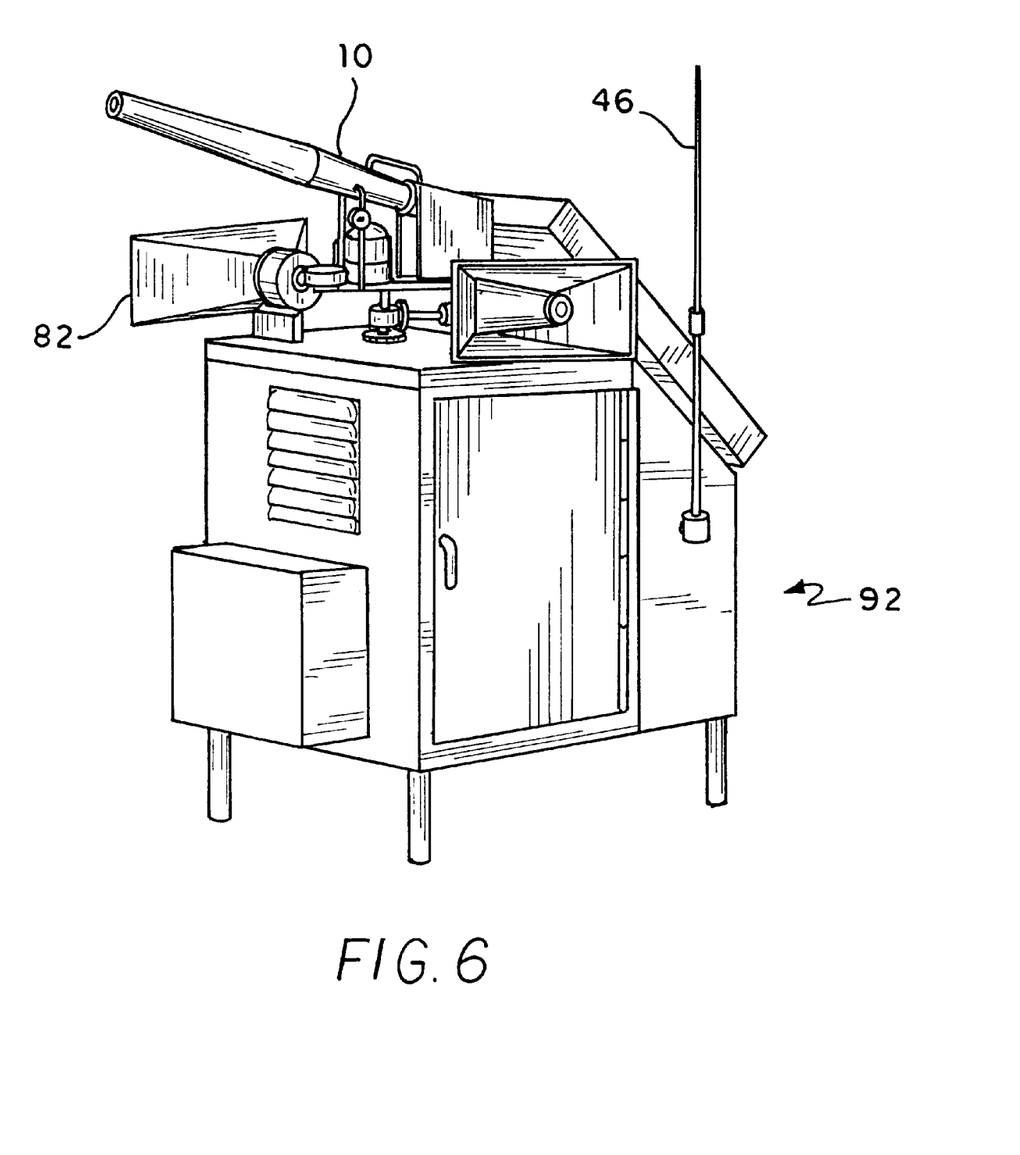
FIG. 6 is a perspective view of an alternative arrangement of the sound unit of the bird dispersing system of the present invention.
Figure 7:
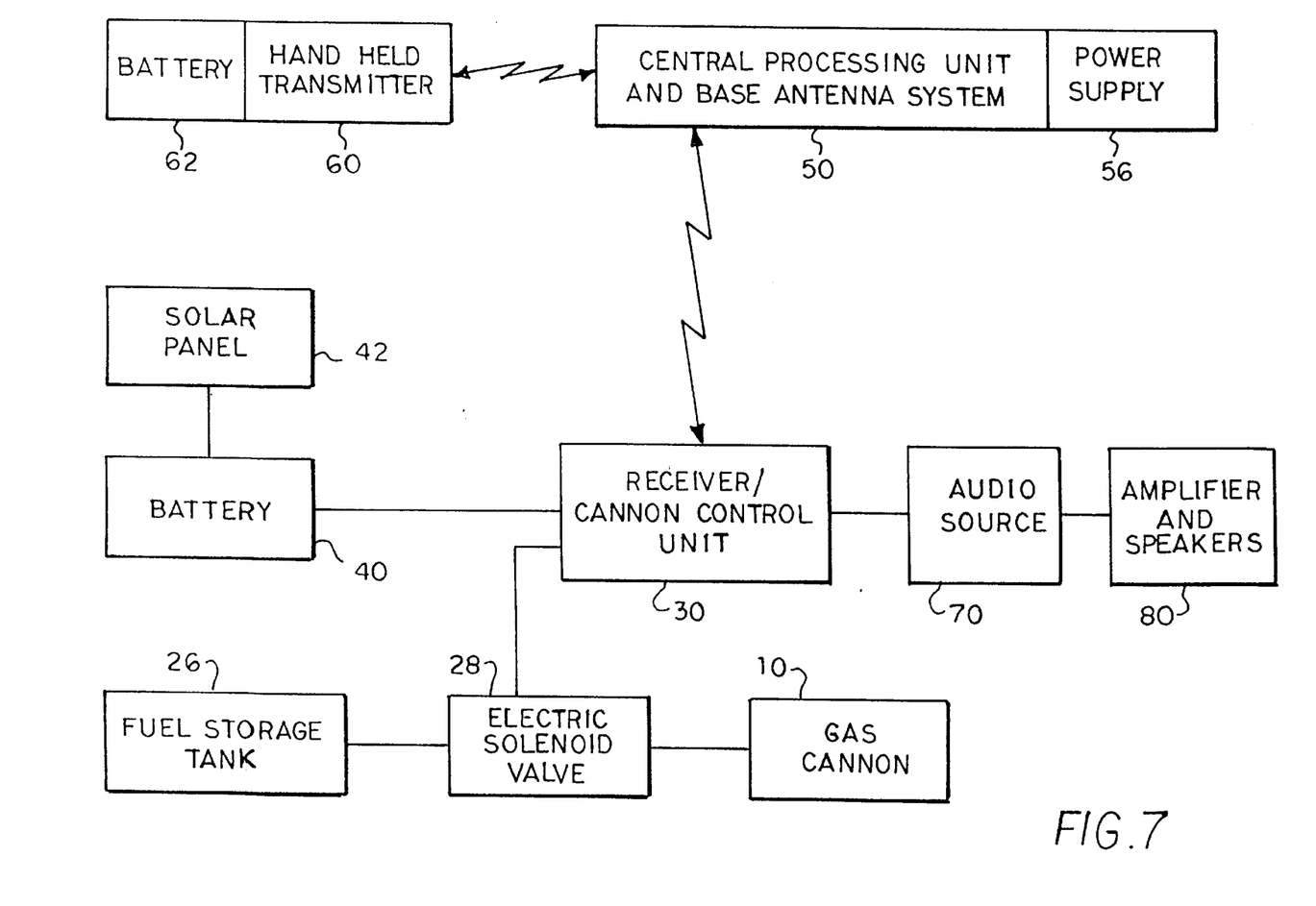
FIG. 7 is a block diagram of another arrangement of the bird dispersing system of the present invention.

FIGS. 5–7 illustrate alternative preferred embodiments which are similar to the embodiment of FIGS. 1–4. In FIG. 5, the control unit 90 includes the same basic components as unit 30 of FIG. 3 with the additional chaotic sound generation capabilities. Unit 90 includes at least a pair of all weather exterior loud speakers 82, such as a 100 watt with a 123 decibel rating. Located in the interior cabinet 36 of control unit 90 are a sound source 84 and an amplifier 86. Sound source 84 reproduces sound records in short intervals in the range of 10–25 seconds. Preferably, the sound records are reproduced in 15–20 seconds. The sound source 84 is generally any conventional sound player. Such types of devices are digitally encoder sound repeaters, tape players, etc. In the preferred embodiment, a multi-channel endless loop tape player is utilized because the random sounds are recorded and played back so as to produce chaotic non-uniform sounds. The use of chaotic sounds prevents wildlife from becoming accustomed to any particular sound pattern, thus rendering the sound sources useless.

The sound source 84 in coupled to the amplifier 86 located in the interior of the control unit 90 In the preferred arrangement, amplifier 86 is a 200 watt, two-channel amplifier, producing 100 watts of amplification in each channel. Each channel output is coupled to one of the two speakers 82. The amplifier 86 receives sound record signals from the sound source 84, amplifying the sounds from each channel of the sound source 84. The sounds reproduced are randomly recorded in each channel, and include but not limited to barking dogs, sirens, breaking glass, roaring lions and bears, etc. The chaotic reproduction of these sounds causes wildlife, particularly fowl to disperse in great haste.

FIG. 6 illustrates a combined embodiment for creating maximum loud noise and sound, causing the dispersement to be even more effective. Control unit 92 incorporates both the gas cannon 10, of FIG. 4 and the broadcast sounds of FIG. 6. The gas cannon 10 is centrally disposed on the top of control unit 92, having the speakers 82 flanking on either side. In this arrangement, the maximum amount of noise is generated. The gas cannon 10 is rotatable about the base, as set forth above. Speakers 82 are utilized to broadcast the chaotic and non-uniform noises. Both of the embodiments are under the supervision of the central computer 50 as seen in FIG. 7. As shown in FIG. 2, the central computer 50 includes a central processing unit 52 and base antenna system or transceiver 54. Likewise, the central computer 50 is remotely controllable by hand held transmitter 60.

It is within the purview of the present invention, to also incorporate a return signalling of control unit (20, 90, 92) so as to inform the central computer 50 of successful noise generation. In this manner, a plurality of units, strategically located about an air field for instance, may be sequentially commanded to "sound off" so as to directionally drive the wildlife away from the air field. This is an extremely useful system for protecting elaborate flying machines from being overcome by an innocent fowl. The system disclosed herein prevents jet engines from being clogged inadvertently by fowl unable to clear from the flight path quickly.

The arrangements of elements in the bird dispersal system of the present invention is diagrammatically represented in FIG. 2. The central computer unit 50 sends a signal to the receivers 44 in the cannon control units 30 either directly using the computer 52 or indirectly using the hand held transmitter 54. The cannon control units 30, which are powered by the battery 40 charged by the solar panel 42, then actuate the valve 28 thereby actuating the gas cannons 10 fueled by fuel storage tanks 26.

With this arrangement, the bird dispersing system may be used to scare birds from an area such as an airfield by placing a number of the gas cannons 10 and cannon control units 30 in strategic positions around the area and selectively operating appropriate combinations of the gas cannons with the central computer 50 unit or the hand held transmitter.

It is to be understood that the present invention is not limited to the embodiments described above, but encompasses any and all embodiments within the scope of the following claims.

We claim:

1. A system for generating loud noise to disperse wildlife comprising:

a housing located at a first remote site;

said housing having a device for producing sound and means for actuating;

said device for producing sound having a support platform displaceable from said housing, and said device for producing sound being selected for the group consisting essentially of cannons, chaotic audio, and a combination of cannons and chaotic audio;

said means for actuating said sound producing device connected thereto, said means for actuating including a radiant energy receiver;

a computer unit located at a second remote site for selectively generating actuation signals, said computer unit including means for transmitting said selectively generated actuation signals to said radiant energy receiver, and said computer including a wireless receiver;

handheld wireless remote transmitter means for selectively transmitting command signals to said computer unit, said command signals controlling said computer unit to selectively generate and transmit said actuation signals.

2. The system according to claim 1, said cannons including:

a combustion chamber;

a fuel storage means for containing a combustible gas under pressure;

valve means coupling said fuel storage means to said combustion chamber, said valve means operably responsive to said means for actuating for admitting a predetermined volume of said combustible gas into said combustion chamber; and means for igniting said combustible gas in said combustion chamber;

wherein an explosion in said combustion chamber produces a sound for dispersing wildlife.

3. The system according to claim 2, said platform of said device for producing sound further including means for directionally positioning said combustion chamber.

4. The system according to claim 3, said means for directionally positioning including a motor and a motor control unit responsive to said means for actuating.

5. The system according to claim 1, said device for producing sound including:

a plurality of sound records;

means for randomly and selectively amplifying at least two of said plurality of sound records; and speaker means for audibly reproducing said at least two of said plurality of sounds records.

6. The system according to claim 5, each said cannons of said device for producing sound including:

a combustion chamber;

a fuel storage means for containing a combustible gas under pressure;

valve means coupling said fuel storage means to said combustion chamber, said valve means operably responsive to said means for actuating for admitting a predetermined volume of said combustible gas into said combustion chamber; and means for igniting said combustible gas in said combustion chamber.

7. The system according to claim 6, said platform of said device for producing sound further including means for directionally positioning said combustion chamber, wherein wildlife is dispersed by any combination of noises generated by explosions and sound records.

8. The system according to claim 7, wherein said means for directionally positioning said combustion chamber includes a motor and a motor control unit responsive to said means for actuating.

9. A wildlife scattering system generating loud noises for dispersing wildlife comprising:

a plurality of strategically located housings, each of said housings includes a noise unit, each said noise unit comprises a device for producing sound having a mounting means, means for actuating said device, said means for actuating including a controller, and a radiant energy receiver, said device for producing sound being selected for the group consisting essentially of cannons, chaotic audio, and a combination of cannons and chaotic audio;

a computer unit located at a base site for selectively generating a plurality of actuation signals, said computer unit including means for transmitting each said selectively generated actuation signal to a respective said radiant energy receiver, and said computer further including a receiver; and transportable wireless remote transmitter means for selectively transmitting command signals to said computer unit, said command signals controlling said computer unit to selectively generate and transmit said actuation signals.

10. The wildlife scattering system according to claim 9, each of said devices for producing sound including a plurality of sound records, means for randomly and selectively amplifying at least two of said plurality of sound records, and speaker means for audibly reproducing said at least two of said plurality of sounds records, said mounting means supporting said speaker means on each said housing.

11. The wildlife scattering system according to claim 10, each of said devices for producing sound further including a combustion chamber, a fuel storage means for containing a combustible gas under pressure, valve means coupling said fuel storage means to said combustion chamber, said valve means operably responsive to said means for actuating for admitting a predetermined volume of said combustible gas into said combustion chamber, and means for igniting said combustible gas in said combustion chamber, said mounting means operatively coupled to randomly and rotationally position said combustion chamber.

12. A system for generating loud noise to disperse wildlife from a land area comprising:

a plurality of noise units decisively located about the land area, each of said noise units comprises a housing, a device for directionally producing sound, means for actuating said device, said means for actuating including a controller, and a radiant energy receiver, said device for producing sound being selected for the group consisting essentially of cannons, chaotic audio, and a combination of cannons and chaotic audio;

computer means, located at a base site, for selectively generating a plurality of actuation signals;

means coupled to said computer means for transmitting each said selectively generated actuation signal to a respective said radiant energy receiver;

cableless moveable remote transmitter means for selectively transmitting command signals to said computer unit, said command signals controlling said computer unit to selectively generate and transmit said actuation signals; and receiver means coupled to said computer means for receiving said command signals;

wherein said housing supports said device for producing sound, said means for actuating, and said radiant energy receiver.

13. The system according to claim 12, each of said devices for producing sound including a plurality of sound records, means for randomly and selectively amplifying at least two of said plurality of sound records, and speaker means for audibly reproducing said at least two of said plurality of sounds records; and a combustion chamber, a fuel storage means for containing a combustible gas under pressure, valve means coupling said fuel storage means to said combustion chamber, said valve means operably responsive to said means for actuating for admitting a predetermined volume of said combustible gas into said combustion chamber, and means for igniting said combustible gas in said combustion chamber.

14. The system according to claim 13, each of said noise units further including a power supply having a battery and a solar panel for maintaining a charge on said battery, said housing further supports said battery and said solar panel.

15. The system according to claim 14, each of said valves being an electronically controlled in response to said actuation signals.

16. The system according to claim 13, said plurality of sound records being an endless loop, multi-channel recording of different sounds, each said sound having a predetermined length.

17. The system according to claim 16, said predetermined sound length is in the range of 10–25 seconds.

18. The system according to claim 17, said predetermined sound length is in the range of 15–20 seconds.

19. The system according to claim 18, each of said means for randomly and selectively amplifying being a two channel amplifier, and each of said speaker means being at least one weather proof speaker connected to each channel of said two channel amplifier.

* * * * *